(12) United States Patent
Huang (10) Patent No.: US 9,644,808 B1
(45) Date of Patent: May 9, 2017

(54) LIGHT ENERGY CONVEYANCE AND CONTROL SYSTEM

(71) Applicant: Howard Raychiyjlin Huang, Tucson, AZ (US)

(72) Inventor: Howard Raychiyjlin Huang, Tucson, AZ (US)

( * ) Notice: Subject to any disclaimer, the term of this patent is extended or adjusted under 35 U.S.C. 154(b) by 0 days.

(21) Appl. No.: 15/046,471

(22) Filed: Feb. 18, 2016

(30) Foreign Application Priority Data

Dec. 28, 2015 (TW) .............................. 104220958 U (51) Int. Cl.
| | |
|---|---|
| *F21S 11/00* | (2006.01) |
| *G02B 5/02* | (2006.01) |
| *F21V 5/00* | (2015.01) |
| *F21S 19/00* | (2006.01) |
| *F21V 13/02* | (2006.01) |

(52) U.S. Cl.
CPC ............ *F21S 11/007* (2013.01); *F21S 19/005* (2013.01); *F21V 5/008* (2013.01); *F21V 13/02* (2013.01); *G02B 5/0278* (2013.01); *G02B 5/0294* (2013.01)

(58) Field of Classification Search
CPC ....... F21S 11/007; F21S 19/005; F21V 5/008; G02B 5/0278

USPC ........ 359/591–592, 707, 737–738, 653–654, 359/455

See application file for complete search history.

(56) References Cited

U.S. PATENT DOCUMENTS

| | | | | |
|---|---|---|---|---|
| 4,246,477 A * | 1/1981 | Latter | ....................... | F21S 2/00 250/214 AL |
| 4,389,085 A * | 6/1983 | Mori | ....................... | F21S 11/00 359/591 |
| 4,740,048 A * | 4/1988 | Mori | ...................... | A01G 7/045 359/592 |
| 5,615,045 A * | 3/1997 | Takuma | ............... | G03B 21/625 348/E5.136 |
| 6,691,701 B1 * | 2/2004 | Roth | ......................... | F24J 2/18 126/600 |
| 7,453,635 B2 * | 11/2008 | Yeo | ...................... | G03B 21/602 359/453 |

* cited by examiner

*Primary Examiner* — Christopher Mahoney (57) ABSTRACT

A light energy conveyance and control system uses a multiple of separately arranged light energy conveyance lenses to define a conveyance path for passing light energy from front to rear, and each light energy conveyance lens has a scatter region for scattering light energy to provide illumination, and the light energy scattered by the scatter region of each light energy conveyance lens is controlled to distribute the light energy on the conveyance path, and the scattered light energy is determined by a scatter area and/or a scatter level.

18 Claims, 8 Drawing Sheets

LIGHT ENERGY CONVEYANCE AND CONTROL SYSTEM

TECHNICAL FIELD

The technical field relates to light energy conveyance, and more particularly to the technologies related to conveyance paths, light energy conveyance lenses, scatter regions, and scatter levels, and the scatter level is described in terms of a bidirectional scatter distribution function (BSDF) model to overcome the energy attenuation occurred during light energy conveyance, so as to convey and distribute light energy in a conveyance path.

BACKGROUND

Using natural light to assist illumination is one of the methods for saving the power consumption of light illumination, but the natural light is limited by different conditions including the interior layout of a building, such as a dark basement of a building or a room blocked by walls. Therefore, if natural light can be collected and conveyed to an indoor environment or any other place requiring illumination, the utilization of natural light will be improved.

In a light energy conveyance related prior art, U.S. Pat. No. 4,246,477 has disclosed a system capable of collecting sunlight, and conveying and distributing the light energy of the sunlight into a building through a conveyance channel. In the conveyance channel, light energy is conveyed by using focusing lenses to receive the light energy, and then a reflective mirror installed at a specific position of the conveyance channel to reflect the light energy to a specific position to provide illumination.

As disclosed in U.S. Pat. No. 6,691,701 and European Patent Publication No. EP2385297 A1, a sunlight collecting system collects sunlight by a primary reflector and directs the sunlight to a secondary reflector, and then uses an adjustable planar reflector to direct the light energy into a building for illumination. Similar literatures such as "The most innovative building integrated daylighting system by Sunportal, brochure received on Sep. 22, 2011" discloses the similar principle.

Although the aforementioned prior arts can convey the external light energy into a building, the major problem resides on the constant loss or attenuation of the collected light energy along the conveyance channel in the conveyance process. For example, a single lens on the conveyance channel reflects approximately 8% of the light for illumination. After 100% of the light energy passes through the front lens, and then through the second to tenth lenses, the conveyed energy is attenuated sequentially to approximately 84%, 77%, . . . 43% of the original energy respectively, and the light energy passing through each lens for illumination becomes less and less. In other words, the longer the distance of conveying light energy on the conveyance channel, the less the energy, and the lower the illumination capability.

The aforementioned loss and attenuation of light energy occurred in the conveyance process is an inevitable physical phenomenon, so that the technical content of U.S. Pat. No. 4,246,477 has disclosed and provided an artificial lighting system to overcome the problems. Theoretically, the light energy emitted by the artificial light source can be controlled precisely, but when the artificial light source is controlled, it is necessary to cope with the attenuation of the illumination along the conveyance channel in order to maintain the same brightness of the illumination after the natural light released from front and rear ends of the conveyance channel is added to the artificial light source. Therefore, the construction and control of the whole illumination system will become more complicated, and the implementation will become more difficult.

SUMMARY

Therefore, it is a primary objective of this disclosure to provide a light energy conveyance and control system that mainly uses a plurality of separately arranged light energy conveyance lenses to define a conveyance path provided for light energy to pass from front to rear, and the light energy scattered by each light energy conveyance lens can be controlled, so as to overcome the problem of the attenuation of the light energy conveyed from the front to the rear of the conveyance path and distribute the light energy to the whole conveyance path uniformly, or distribute the light energy to the conveyance path according to different proportions to overcome the problem of the attenuation of the light energy conveyed from the front to the rear of the conveyance path.

To achieve the aforementioned and other objectives, this disclosure provides a light energy conveyance and control system, comprising: a plurality of separately arranged light energy conveyance lenses, and the plurality of light energy conveyance lenses defining a conveyance path provided for light energy to pass from front to rear, characterized in that each light energy conveyance lens has a scatter region capable of scattering the light energy to provide illumination, and the scatter region of each light energy conveyance lens is capable of scattering light energy of different magnitudes according to a scatter area and/or a scatter level, and the smaller the scatter area and/or scatter level of the scatter region, the smaller the scattered light energy and the loss of light energy passing through the light energy conveyance lens and conveying the light energy to the next light energy conveyance lens, and vice versa.

In the aforementioned system, the scatter area of the scatter region of each light energy conveyance lens can be set, and the scatter level can be described by a bidirectional scatter distribution function model (BSDF model) and controlled precisely, so that the scattered light energy on the conveyance path can be allocated freely to distribute the light energy to the whole conveyance path uniformly, or distribute the light energy to the conveyance path according to different proportions, so as to overcome the problem of the attenuation of the light energy conveyed from the front to the rear of the conveyance path.

In an embodiment, the light energy scattered by the scatter region of each light energy conveyance lens is positively correlated with the area and/or the scatter level of the scatter region.

In an embodiment, the scatter area of the scatter region of two adjacent light energy conveyance lenses near the light source is smaller than the scatter area of the scatter region away from the light source, or the scatter level of the scatter region near the light source is smaller than the scatter level of the scatter region away from the light source. When the light energy sequentially passing from front to rear through each light energy conveyance lens on the conveyance path is attenuated, with the less light energy passing through the rear light energy conveyance lens, the relatively larger scatter area and/or scatter level of the scatter region of the rear light energy conveyance lens scatters approximately the same amount of light energy scattered by the front light energy conveyance lens, so the light energy on the conveyance path can be distributed uniformly.

In an embodiment, the scatter level of the scatter region is defined by different smoothness of the surface of the scatter region of each light energy conveyance lens, and the smoothness is negatively correlated with the scatter level.

In an embodiment, the scatter region of each light energy conveyance lens is formed by attaching a scatter sheet with a scatter capability onto a surface of each light energy conveyance lens.

In an embodiment, the plurality of light energy conveyance lenses is installed in an axial space inside a conveyance channel or a hollow conveyance tube, so that the light energy on the conveyance path is restricted to pass inside the conveyance channel or the hollow conveyance tube, and the conveyance channel or the hollow conveyance tube has at least one light inlet for entering the light energy into the axial space.

In an embodiment, the whole or a part of the conveyance channel or the hollow conveyance tube is a translucent outer wall, so that the light energy scattered by the scatter region can be passed through the translucent outer wall and reflected to the outside of the conveyance channel or the hollow conveyance tube to form illumination light.

In an embodiment, the translucent outer wall has an optical structure capable of scattering a soft illumination light.

In an embodiment, the conveyance channel or the hollow conveyance tube has an opaque outer wall, and the outer wall has an aperture formed at a position corresponding to each light energy conveyance lens, and the light energy scattered by the scatter region of each light energy conveyance lens can pass through the respective aperture to provide illumination.

In an embodiment, the light energy source of the light inlet includes sunlight and/or an artificial light source.

Compared with the prior art, this disclosure uses a plurality of separately arranged light energy conveyance lenses to define a light energy conveyance path, and each light energy conveyance lens has a scatter region for scattering light energy to provide illumination. By controlling the scatter area and/or the scatter level of each scatter region, the light energy on the conveyance path can be allocated freely to distribute the light energy to the whole conveyance path uniformly, or distribute the light energy on the conveyance path according to different proportions to overcome the problem of the attenuation of light energy conveyed from the front to the rear of the conveyance path.

The above and other objects, features and advantages of this disclosure will become apparent from the following detailed description taken with the accompanying drawings.

DESCRIPTION OF THE PREFERRED EMBODIMENTS

The technical content of this disclosure will become apparent with the detailed description of preferred embodiments and the illustration of related drawings as follows.

Figure 1:
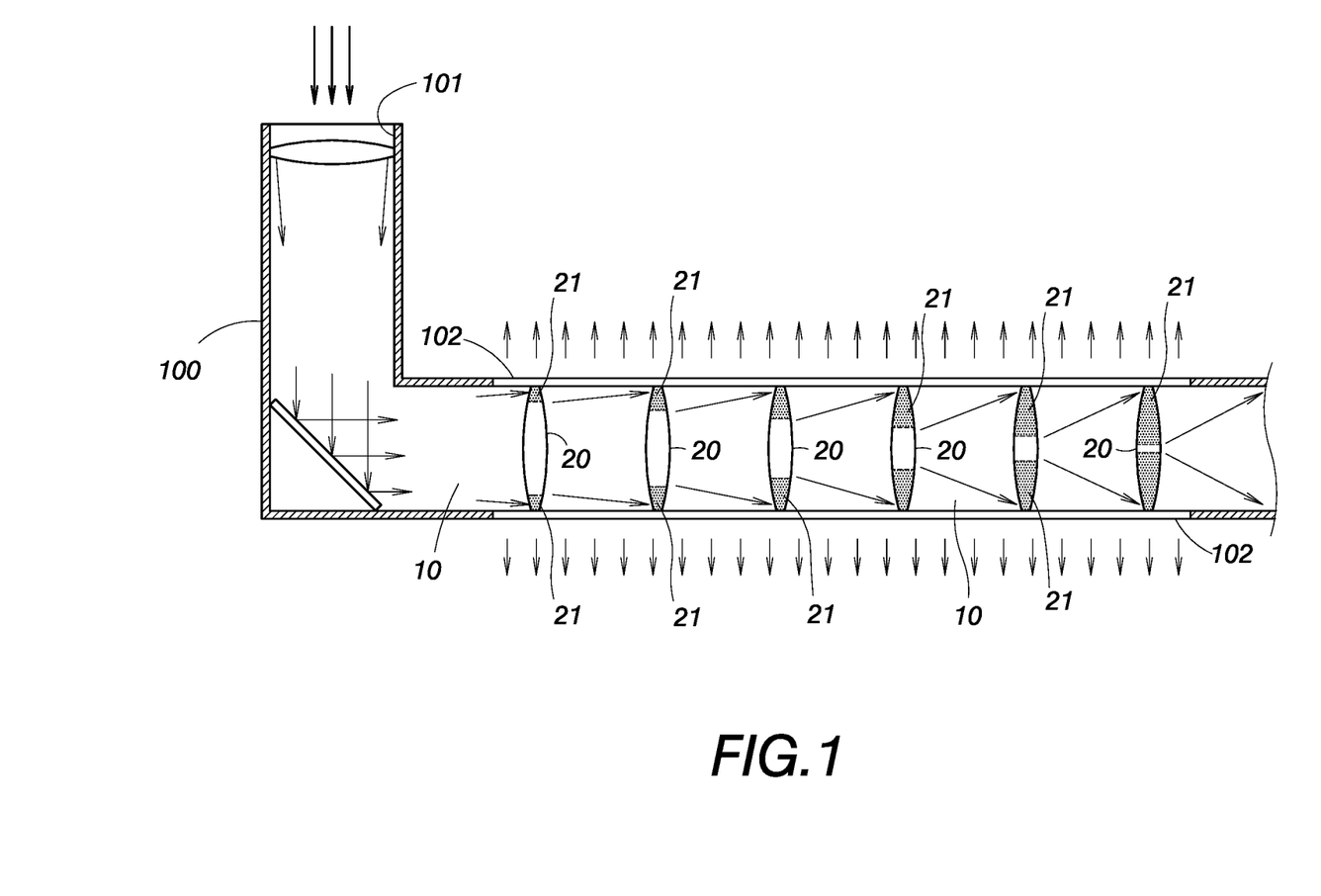
FIG. 1 is a schematic view of the system architecture of this disclosure.
Figure 2:
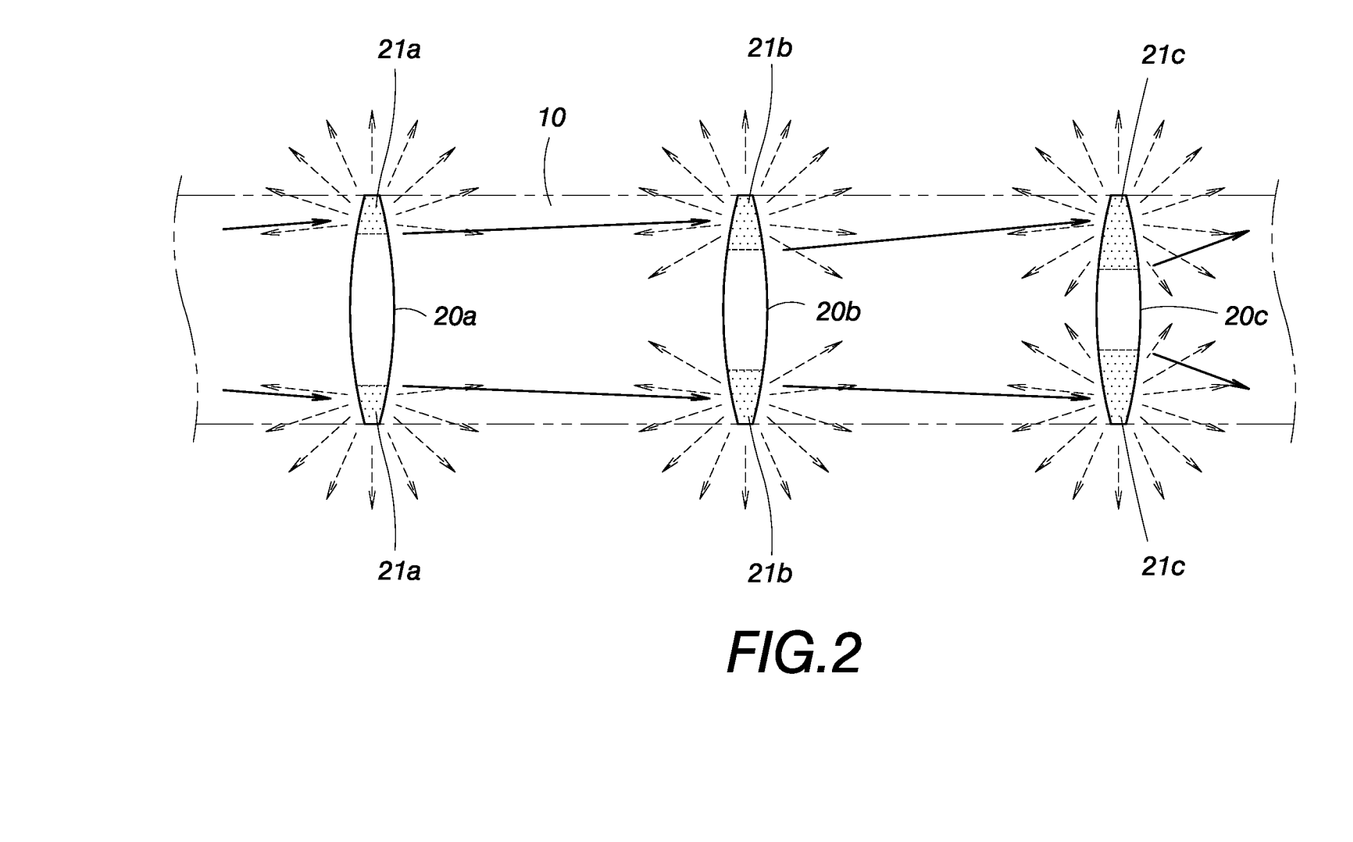
FIG. 2 is a schematic view of a conveying light energy by a plurality of light conveyance lenses.
Figure 3:
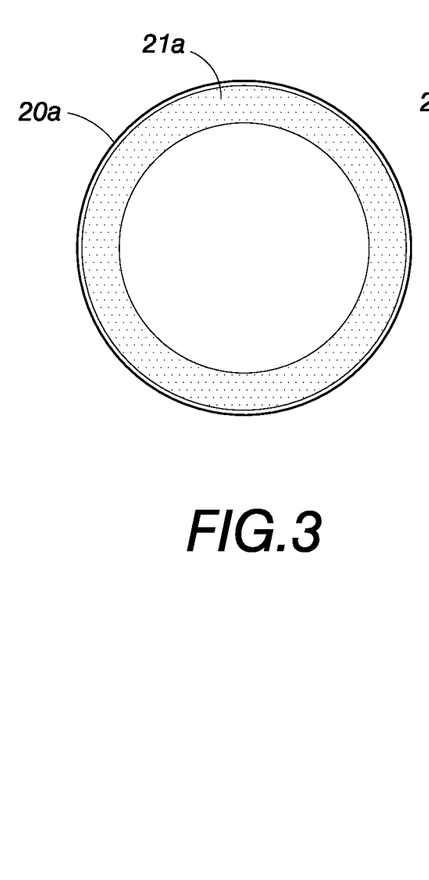
FIG. 3 is a schematic view of a light energy conveyance lens and a scatter region in accordance with a first preferred embodiment.
Figure 4:
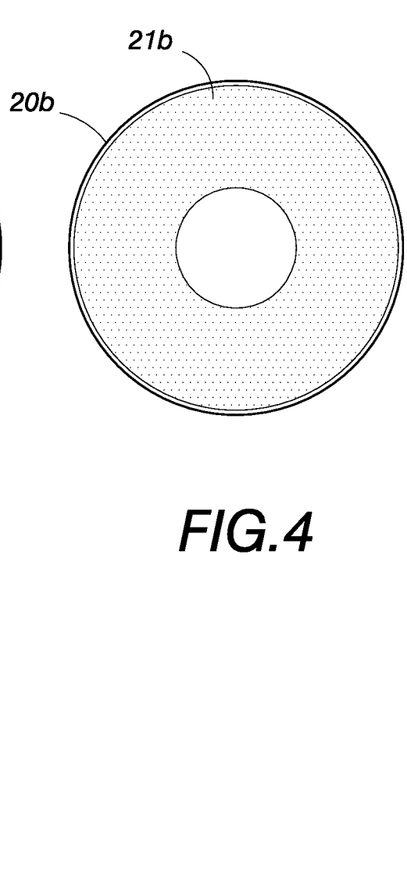
FIG. 4 is a schematic view of a light energy conveyance lens and a scatter region in accordance with a second preferred embodiment.
Figure 5:
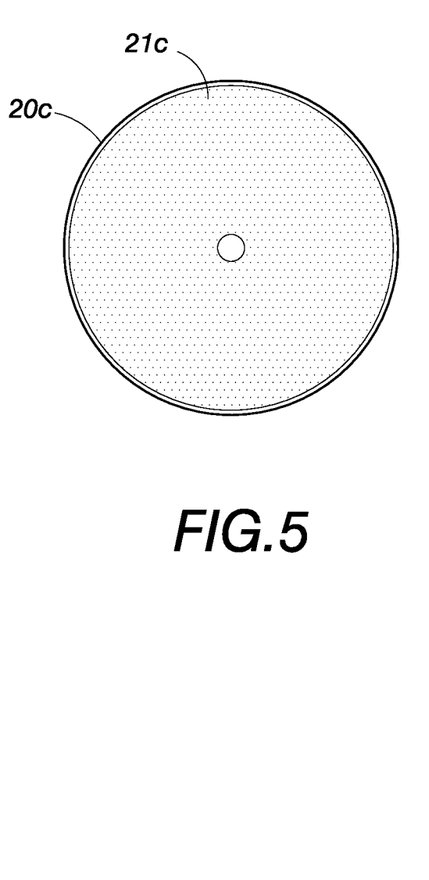
FIG. 5 is a schematic view of a light energy conveyance lens and a scatter region in accordance with a third preferred embodiment.

With reference to FIG. 1 for a light energy conveyance and control system of this disclosure, the light energy conveyance and control system comprises a conveyance path 10 provided for passing light energy and defined by a plurality of separately arranged light energy conveyance lenses 20. When the light energy is passed from the front to the rear through each light energy conveyance lens 20 sequentially, the conveyance path 10 is formed.

In an embodiment, the plurality of separately arranged light energy conveyance lenses 20 is installed in an axial space inside a conveyance channel or a hollow conveyance tube 100, so that the light energy on the conveyance path 10 is restricted to pass inside the conveyance channel or the hollow conveyance tube 100. In a hollow conveyance tube 100 as shown in FIG. 1, a conveyance channel (not shown in the figure) may be installed in a building. For example, the conveyance channel is a U-shape trough combined with a ceiling inside the building, and the U-shape trough is the axial space provided for installing the plurality of light energy conveyance lenses 20.

In the figure, the conveyance channel or the hollow conveyance tube 100 has at least one light inlet 101 formed thereon provided for entering light energy to the conveyance path 10. In this embodiment, each light energy conveyance lens 20 is a focusing lens, and the light energy conveyance lens 20 is made of the focusing lens and capable of scattering light energy and conveying the light energy from the front to the rear of the conveyance lens. Therefore, after the light energy enters into the axial space of the conveyance channel or the hollow conveyance tube 100 from the light inlet 101, the light energy can be passed through the light energy conveyance lens 20 and conveyed from the front to the rear on the conveyance path 10.

This disclosure is characterized in that each light energy conveyance lens 20 has a scatter region 21 capable of scattering the light energy for illumination, and the scatter region 21 of each light energy conveyance lens 20 can scatter the light energy with different magnitudes according to the change of the scatter area and/or the scatter level. The smaller the scatter area and/or the scatter level of the scatter region 21, the less the light energy, and the less loss of light energy that is passed through the light energy conveyance lens and conveyed to the next light energy conveyance lens, and vice versa.

In FIGS. 2 to 5, after light energy is passed through a first scatter region 21a of the first light energy conveyance lens 20a and a portion of the light energy is scattered to provide illumination, the light energy conveyed to a second light energy conveyance lens 20b will be attenuated. Now, if the second scatter region 21b of the second light energy conveyance lens 20b has the same scatter area and/or scatter level of the first scatter region 21a, then the light energy scattered by the second scatter region 21b will be weaker, and the illumination of the conveyance path 10 will be attenuated from the front to the rear.

In an embodiment of this disclosure, the scatter area of the first scatter region 21a is designed to be smaller than the scatter area of the second scatter region 21b while maintaining the scatter level unchanged. Although the second light energy conveyance lens 20b with less light energy passing through, the second scatter region 21b with a relatively larger scatter area is provided for scattering an amount of light energy approximately equal to that of the first scatter region 21a for illumination, and so forth. If the scatter area of the third scatter region 21c of the third light energy conveyance lens 20c is greater than the scatter area of the second scatter region 21b, almost the same amount of light energy of the second scatter region 21b is scattered for illumination, so as to distribute the light energy to the whole conveyance path 10 uniformly.

Of course, this disclosure also can distribute the light energy to the whole conveyance path 10 freely for illumination by controlling the scatter area, in addition of distributing the light energy to the whole conveyance path 10 uniformly. For example, if the scatter area of the second scatter region 21b is much greater than that of the first scatter region 21a, although the second light energy conveyance lens 20b with less light energy passing through, the scatter area of the second scatter region 21b much greater than that of the first scatter region 21a is provided for scattering much more light energy than that of the first scatter region 21a for illumination.

It is noteworthy that the scatter level can be described by a bidirectional scatter distribution function model (BSDF models). In FIGS. 2 to 5, the light energy scattered by the scatter region is controlled by the scatter area, while maintaining the scatter area unchanged, and the area of the scatter region 21a, 21b, 21c is positively correlated with the scattered light energy. For example, in the first scatter region 21a of the first light energy conveyance lens 20a and the second scatter region 21b of the second light energy conveyance lens 20b adjacent to each other, the second scatter region 21b has an area greater than that of the first scatter region 21a and a scatter level greater than that of the first scatter region 21a.

Figure 6:
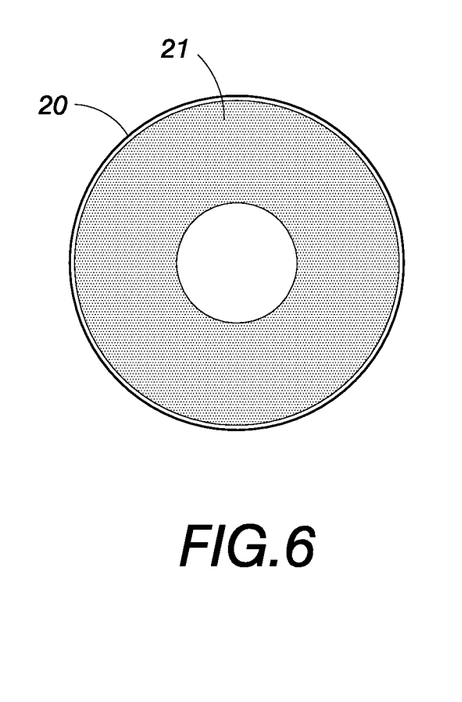
FIG. 6 is a schematic view of a light energy conveyance lens and a scatter region in accordance with a fourth preferred embodiment.

With reference to FIG. 6 for a scatter region 21 of a light energy conveyance lens 20 in accordance with another embodiment of this disclosure, the scatter level is controlled to let the scatter region 21 scatter light energy with different magnitudes while maintaining the area of the scatter region 21 unchanged. In a simple way of implementing the scatter level, the scatter level is determined by the smoothness of the surface of the scatter region 21. Provided that the areas are the same, the higher the smoothness of the scatter region 21, the smaller the scatter level. In two adjacent light energy conveyance lenses 20, if the smoothness of the scatter region 21 near the light source is smaller than the smoothness of the scatter region 21 away from the light source, then the light energy on the conveyance path can be distributed uniformly.

In addition, the scatter area and the scatter level described by a bidirectional scatter distribution function model can be used as variables to calculate the light energy scattered by each scatter region. For example, when the scatter region of the front conveyance lens is compared with the scatter region of the rear conveyance lens, the former has a greater scatter area and a smaller scatter level, so that the ratio of the scatter area to the scatter level is used for the calculation of the light energy scatter from both scatter regions, so as to distribute the light energy onto the conveyance path freely.

Figure 7:
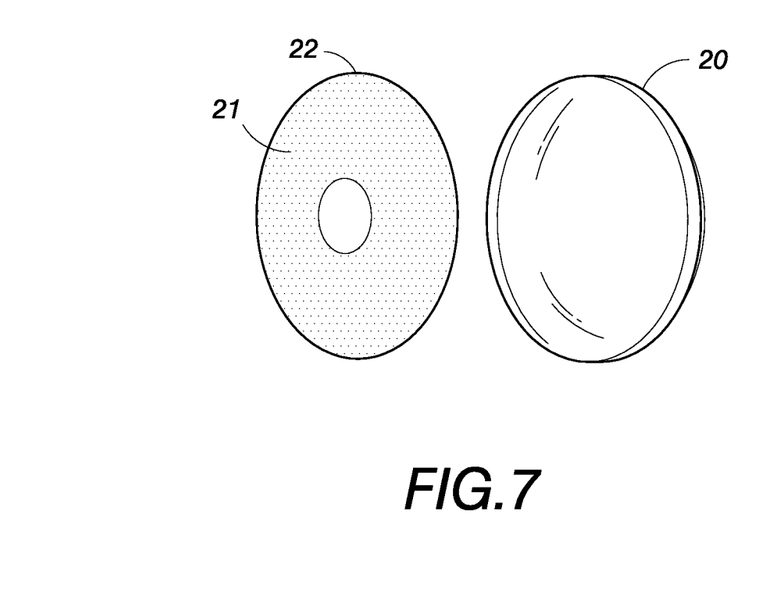
FIG. 7 is a schematic view of a light energy conveyance lens and a scatter region in accordance with a fifth preferred embodiment.

The scatter region 21 may be integrally formed directly on a surface of the conveyance lens 20 with a different area or smoothness when each light energy conveyance lens 20 is formed, or a scatter sheet 22 with a scattering capability is prepared first and then attached onto a surface of the light energy conveyance lens 20 as shown in FIG. 7, so that the scatter sheet 22 on the light energy conveyance lens 20 forms the scatter region 21.

Figure 8:
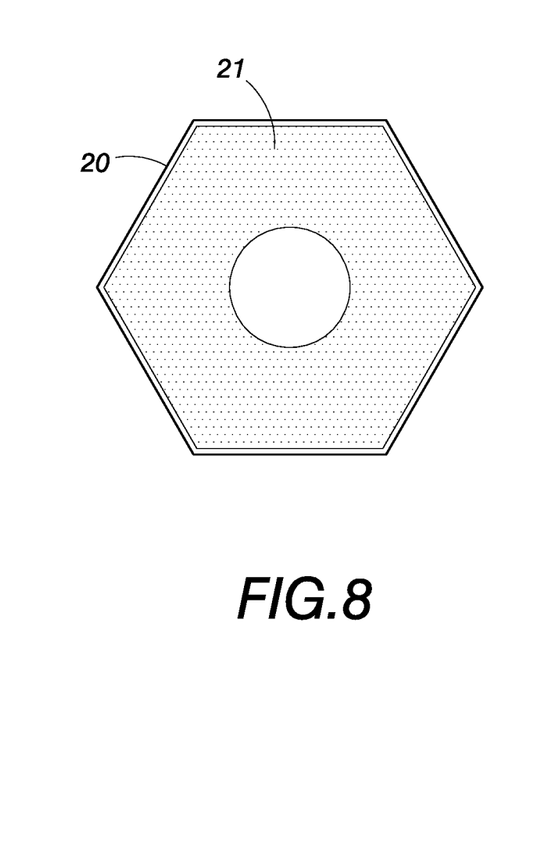
FIG. 8 is a schematic view of a light energy conveyance lens and a scatter region in accordance with a sixth preferred embodiment.
Figure 9:
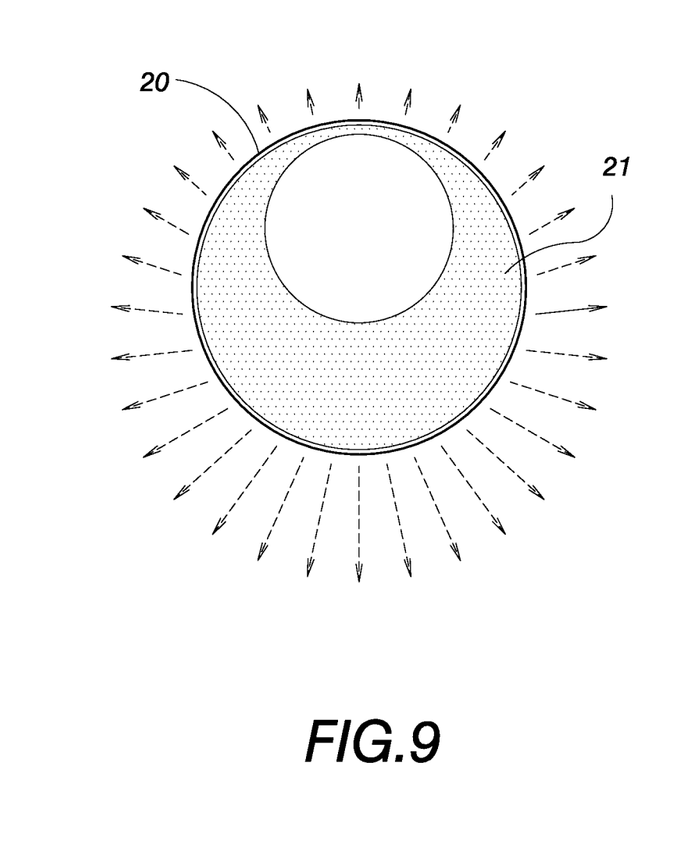
FIG. 9 is a schematic view of a light energy conveyance lens and a scatter region in accordance with a seventh preferred embodiment.

With reference to FIG. 8 for an embodiment of the light energy conveyance lens 20, the shape of the light energy conveyance lens 20 is not limited to the circular shape only, but any geometric shape may be adopted. In addition, the scatter region 21 is not limited to be distributed uniformly around the periphery of the light energy conveyance lens 20, but the following arrangement as shown in FIG. 9 may be adopted as well. In FIG. 9, the center position of the scatter region 21 is situated at a position slightly above the center of the light energy conveyance lens 20, so that more light energy is scattered from the bottom of the light energy conveyance lens 20, and such arrangement is applicable for the case of setting the conveyance path at the top of an indoor environment, and more light energy can be scattered downward for illumination.

With reference to FIG. 1 for the method of scattering light energy from the scatter region 21 of each light energy conveyance lens 20 for illumination, the whole or a part of the outer wall 102 of the conveyance channel or hollow conveyance tube 100 may be made of a translucent material, so that the light energy scatted from the scatter region 21 and passed through the translucent outer wall 102 and refracted to the outside of the conveyance channel or the hollow conveyance tube 100 for conveying light energy through the whole conveyance channel or hollow conveyance tube 100.

Figure 10:
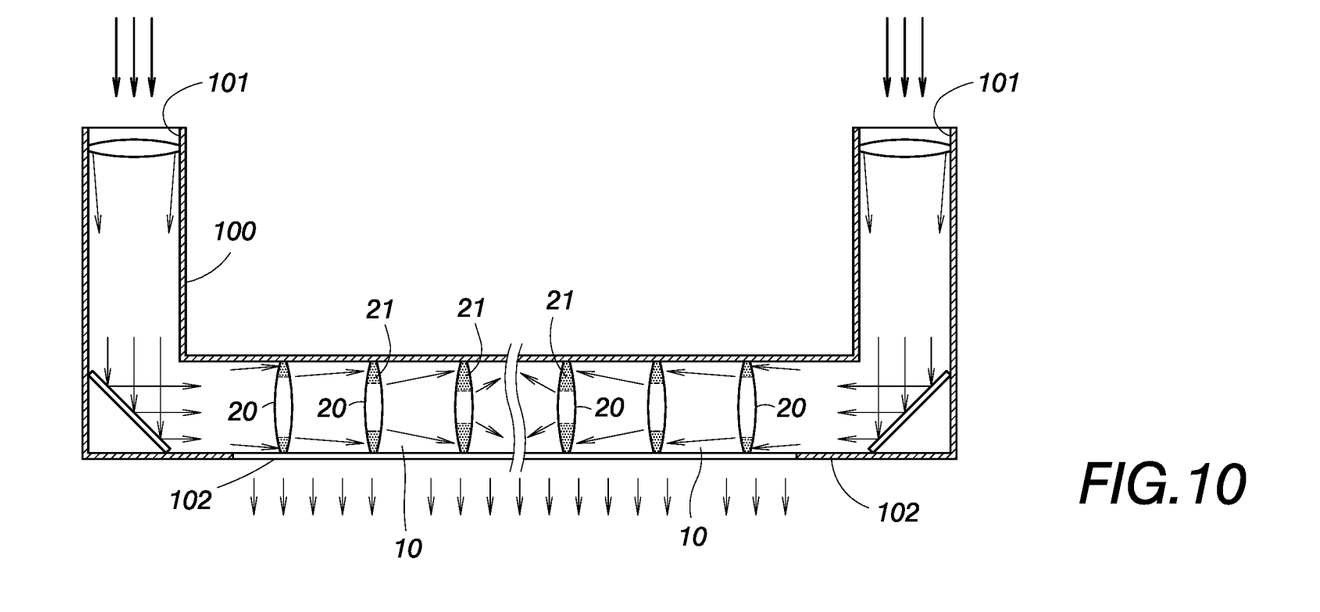
FIG. 10 is a schematic view of a hollow conveyance tube in accordance with an embodiment of this disclosure.

In FIG. 10, a part of the outer wall 102 of the conveyance channel or the hollow conveyance tube 100 is made of a translucent material, so that only a portion of the light energy scatted from the scatter region 21 of the light energy conveyance lens 20 is refracted to the outside for illumination. In FIG. 10, only the bottom of the outer wall 102 of the hollow conveyance tube 100 is transparent, but light may pass through the outer wall 102 in an axial direction of the hollow conveyance tube 100 and at positions apart from each other. For the opaque portion of the outer wall 102, reflection or diffusion may be used to minimize the loss of light energy and make the light softer.

Figure 11:
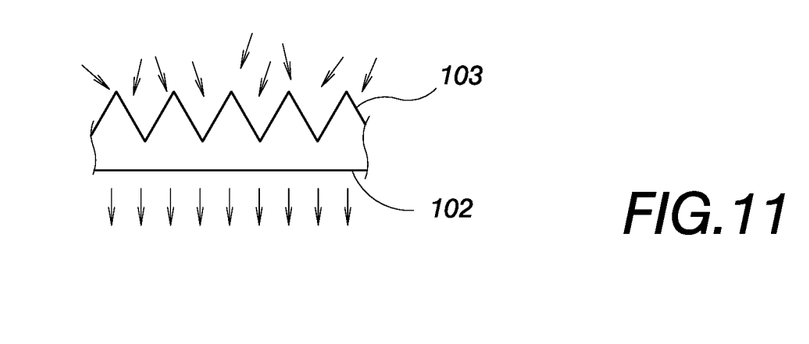
FIG. 11 is a schematic view of an outer wall of a hollow conveyance tube in accordance with an embodiment of this disclosure.

In FIG. 11, the outer wall 102 further includes an optical structure 103 for refracting a softer light from the transparent outer wall 102 and distributing light energy uniformly, wherein the optical structure 103 may be prior art or a novel technology, and the figures shows a pattern line capable of refracting the light energy downward.

Figure 12:
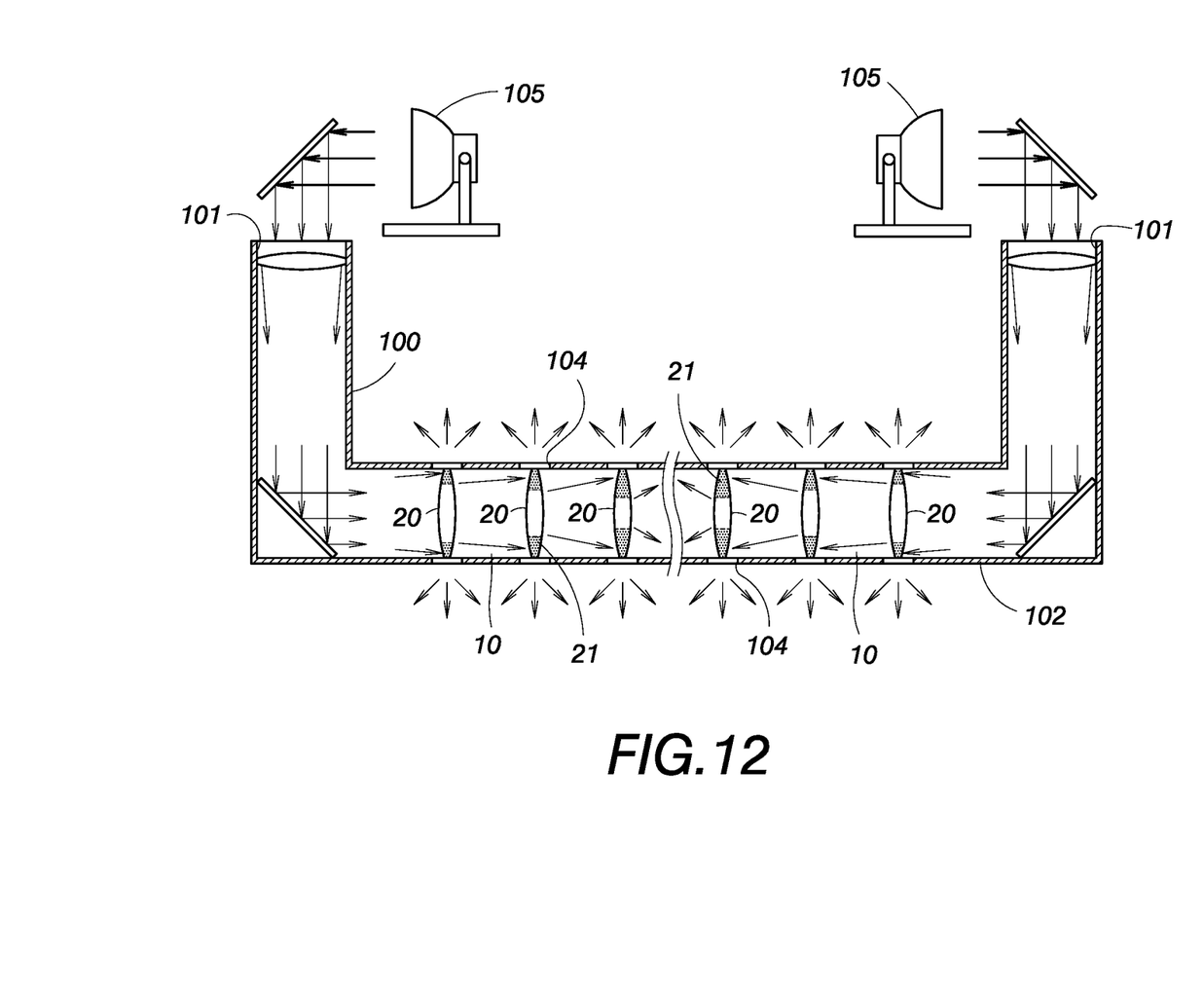
FIG. 12 is a schematic view of providing light energy by artificial light source in accordance with this disclosure.

In FIG. 12, the outer wall 102 of the hollow conveyance tube 100 is made of an opaque material, and has an aperture 104 formed at a position corresponding to each respective light energy conveyance lens 20, so that the light energy scattered from the scatter region 21 of each light energy conveyance lens 20 can be passed through the corresponsive aperture 104 and scattered for illumination. There may be two or more light inlets 101 on the hollow conveyance tube 100 as needed. FIG. 12 shows two light inlets 101 formed at both ends of the hollow conveyance tube 100 respectively.

The light energy source passing through the light inlet 101 and entering into the hollow conveyance tube 100 may be sunlight or an artificial light source, so that the illumination device 105 provides light energy. In an embodiment, the sunlight and artificial light source may provide light energy separately or simultaneously. The way of collecting more sunlight or the implementation of the illumination device 105 is a prior art, and thus will not be described in details.

Figure 13:
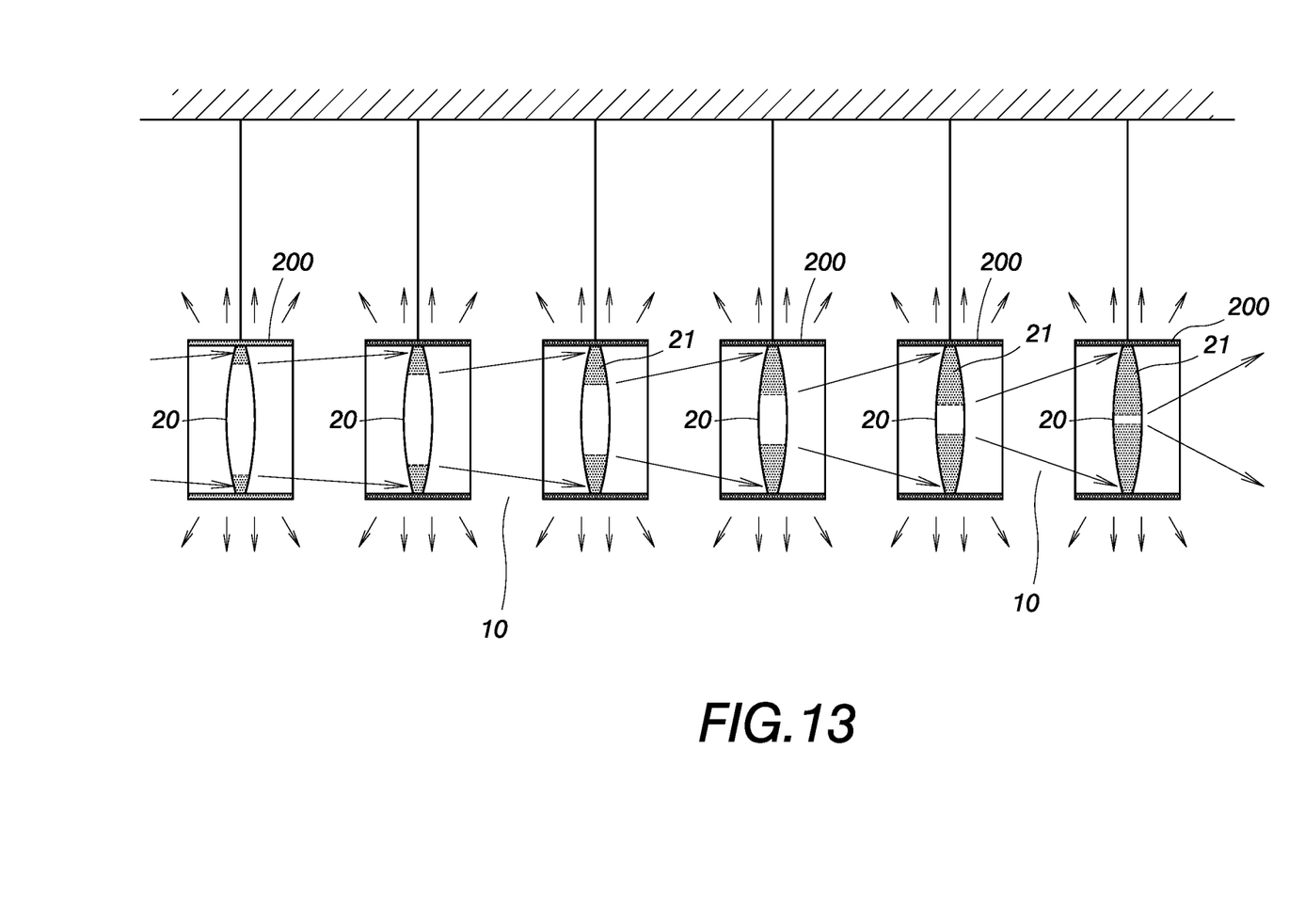
FIG. 13 is a schematic view showing a method of fixing a light energy conveyance lens of this disclosure.

Each light energy conveyance lens 20 is fixed to the conveyance channel or the hollow conveyance tube 100, or each light energy conveyance lens 20 is fixed to a casing 200 as shown in FIG. 13. Each casing 200 penetrating from front to rear is disposed on the conveyance path 10 without hindering the light energy from passing through each light energy conveyance lens 20, and its shape is not limited to a circular shape, a geometric shape, or a non-geometric shape, and each casing 200 is made of a translucent material so as to provide a function similar to a lampshade. When each casing 200 is suspended in air of a building or fixed by another method, and each light energy conveyance lens 20 scatters light energy by the scatter region 21, light may pas through each casing 200 to the outside. In this FIG. 13, each casing 200 is hanged below the building by a transparent fiber line, so that each casing 200 is visually suspended in the air to produce a special light emanation effect.

What is claimed is:

1. A light energy conveyance and control system, comprising a plurality of separately arranged light energy conveyance lenses, the plurality of light energy conveyance lenses defining a conveyance path provided for light energy to pass from front to rear, characterized in that each light energy conveyance lens has a scatter region capable of scattering the light energy to provide illumination, and the scatter region of each light energy conveyance lens is capable of scattering light energy of different magnitudes according to a scatter area or a scatter level, and the smaller the scatter area or scatter level of the scatter region, the smaller the scattered light energy and the loss of light energy passing through the light energy conveyance lens and conveying the light energy to the next light energy conveyance lens, and vice versa;

wherein in the scatter regions of two adjacent light energy conveyance lenses, the scatter region near the light source has a scatter area smaller than the scatter area of the scatter region away from the light source, or the scatter region near the light source has a scatter level smaller than the scatter level of the scatter region away from the light source, so that the light energy on the conveyance path is distributed uniformly; and wherein the light energy scattered by the scatter region of each light energy conveyance lens is positively correlated with the area or scatter level of the scatter region.

2. The light energy conveyance and control system according to claim 1, wherein the scatter region of each light energy conveyance lens is formed by attaching a scatter sheet on a surface of each respective light energy conveyance lens.

3. The light energy conveyance and control system according to claim 1, wherein the scatter level of the scatter region is defined by the smoothness of the surface of the scatter region of each light energy conveyance lens and the smoothness is negatively correlated with the scatter level.

4. The light energy conveyance and control system according to claim 3, wherein the scatter region of each light energy conveyance lens is formed by attaching a scatter sheet onto a surface of each light energy conveyance lens.

5. The light energy conveyance and control system according to claim 3, wherein the plurality of light energy conveyance lenses is installed in a conveyance channel or an axial space inside a hollow conveyance tube, so that the light energy on the conveyance path is restricted to pass inside the conveyance channel or the hollow conveyance tube, and the conveyance channel or the hollow conveyance tube has at least one light inlet provided for the light energy to enter into the axial space.

6. The light energy conveyance and control system according to claim 5, wherein the conveyance channel or the hollow conveyance tube is totally or partially set as a translucent outer wall, so that the light energy scattered by the scatter region may pass through the translucent outer wall and refract to the outside of the conveyance channel or the hollow conveyance tube to form an illumination light.

7. The light energy conveyance and control system according to claim 6, wherein the translucent outer wall has an optical structure capable of refracting a soft illumination light.

8. The light energy conveyance and control system according to claim 5, wherein the conveyance channel or the hollow conveyance tube has an opaque outer wall, and an aperture formed at a position of the outer wall corresponding to each respective light energy conveyance lens, and the light energy scattered by the scatter region of each light energy conveyance lens may pass through the corresponsive aperture to provide illumination.

9. The light energy conveyance and control system according to claim 5, wherein the light energy source of the light inlet includes sunlight and/or an artificial light source.

10. The light energy conveyance and control system according to claim 3, wherein each light energy conveyance lens is fixed onto a translucent casing, and each casing is penetrated from front to rear and disposed on the conveyance path, and when light energy is scattered by the scatter region of each light energy conveyance lens, light may be passed and scattered through each casing.

11. A light energy conveyance and control system, comprising a plurality of separately arranged light energy conveyance lenses, the plurality of light energy conveyance lenses defining a conveyance path provided for light energy to pass from front to rear, characterized in that each light energy conveyance lens has a scatter region capable of scattering the light energy to provide illumination, and the scatter region of each light energy conveyance lens is capable of scattering light energy of different magnitudes according to a scatter area or a scatter level, and the smaller the scatter area or scatter level of the scatter region, the smaller the scattered light energy and the loss of light energy passing through the light energy conveyance lens and conveying the light energy to the next light energy conveyance lens, and vice versa;

wherein the plurality of light energy conveyance lenses is installed in a conveyance channel or an axial space inside a hollow conveyance tube, so that the light energy on the conveyance path is restricted to pass inside the conveyance channel or the hollow conveyance tube, and the conveyance channel or the hollow conveyance tube has at least one light inlet provided for the light energy to enter into the axial space; and wherein the light energy scattered by the scatter region of each light energy conveyance lens is positively correlated with the area or scatter level of the scatter region.

12. The light energy conveyance and control system according to claim 11, wherein the conveyance channel or the hollow conveyance tube is totally or partially set as a translucent outer wall, so that the light energy scattered by the scatter region may pass through the translucent outer wall and refract to the outside of the conveyance channel or the hollow conveyance tube to form an illumination light.

13. The light energy conveyance and control system according to claim 12, wherein the translucent outer wall has an optical structure capable of refracting a soft illumination light.

14. The light energy conveyance and control system according to claim 11, wherein the conveyance channel or the hollow conveyance tube has an opaque outer wall, and an aperture formed at a position of the outer wall corresponding to each respective light energy conveyance lens, and the light energy scattered by the scatter region of each light energy conveyance lens may pass through the corresponsive aperture to provide illumination.

15. The light energy conveyance and control system according to claim 11, wherein the light energy source of the light inlet includes sunlight and/or an artificial light source.

16. The light energy conveyance and control system according to claim 11, wherein the scatter level of the scatter region is defined by the smoothness of the surface of the scatter region of each light energy conveyance lens and the smoothness is negatively correlated with the scatter level.

17. A light energy conveyance and control system, comprising a plurality of separately arranged light energy conveyance lenses, the plurality of light energy conveyance lenses defining a conveyance path provided for light energy to pass from front to rear, characterized in that each light energy conveyance lens has a scatter region capable of scattering the light energy to provide illumination, and the scatter region of each light energy conveyance lens is capable of scattering light energy of different magnitudes according to a scatter area or a scatter level, and the smaller the scatter area or scatter level of the scatter region, the smaller the scattered light energy and the loss of light energy passing through the light energy conveyance lens and conveying the light energy to the next light energy conveyance lens, and vice versa;

wherein each light energy conveyance lens is fixed onto a translucent casing, and each casing is penetrated from front to rear and disposed on the conveyance path, and when light energy is scattered by the scatter region of each light energy conveyance lens, light is passed and scattered through each casing; and wherein the light energy scattered by the scatter region of each light energy conveyance lens is positively correlated with the area or scatter level of the scatter region.

18. The light energy conveyance and control system according to claim 17, wherein the scatter level of the scatter region is defined by the smoothness of the surface of the scatter region of each light energy conveyance lens and the smoothness is negatively correlated with the scatter level.

* * * * *